US009745187B2

(12) United States Patent
McDonald et al.

(10) Patent No.: US 9,745,187 B2
(45) Date of Patent: Aug. 29, 2017

(54) CARBONATED FLUID DISPENSER WITH ULTRASONIC FOAMING MECHANISM

(71) Applicants: David Arlen McDonald, Merimack, NH (US); Phillip Petracca, Howell, NJ (US); William Scott Keeley, Charlestown, RI (US)

(72) Inventors: David Arlen McDonald, Merimack, NH (US); Phillip Petracca, Howell, NJ (US); William Scott Keeley, Charlestown, RI (US)

(73) Assignee: Fizzics Group LLC, Merimack, NH (US)

( * ) Notice: Subject to any disclaimer, the term of this patent is extended or adjusted under 35 U.S.C. 154(b) by 80 days.

(21) Appl. No.: 14/790,254

(22) Filed: Jul. 2, 2015

(65) Prior Publication Data

US 2016/0325243 A1 Nov. 10, 2016

Related U.S. Application Data

(63) Continuation-in-part of application No. 14/703,991, filed on May 5, 2015.

(51) Int. Cl.
*A47J 31/00* (2006.01)
*B67D 1/12* (2006.01)
(Continued)

(52) U.S. Cl.
CPC ............ *B67D 1/1275* (2013.01); *B67D 1/02* (2013.01); *B67D 1/10* (2013.01)

(58) Field of Classification Search
CPC ........ A47J 31/00; A47J 31/002; A47J 31/005; B67D 1/00; B67D 1/0043; B67D 1/0057;
(Continued)

(56) References Cited

U.S. PATENT DOCUMENTS 2,675,822 A * 4/1954 Redlin ................ B67D 1/1416
137/170.3
2,680,010 A * 6/1954 Dubay ................. B05B 7/0037
239/343

(Continued)

FOREIGN PATENT DOCUMENTS

CN 204251325 U 4/2015
DK WO2008000271 A3 2/2008

(Continued)

OTHER PUBLICATIONS

Gizmodo.com Guinness Surger (Article title and article title) Gizmodo.com Mar. 14, 2006 Published on world wide web.

*Primary Examiner* — Michael Laflame, Jr.
(74) *Attorney, Agent, or Firm* — Keeley DeAngelo LLP; W Scott Keeley

(57) ABSTRACT

The embodiment relates to beverage dispensing, and more particularly to the dispensing of a beverage, from a beverage container into a vessel, providing a portion of the beverage as foam atop the dispensed beverage. To avoid the reduction of absorbed carbon dioxide in a carbonated beverage, increased atmospheric pressure is employed to move the beverage from the container through the apparatus and into the vessel. An oscillating means provides a sonic wave through a conduit and the liquid therein; the sonic wave initiates the reaction between the carbon dioxide and the ingredients in a carbonated beverage to cause the liquid to foam prior to dispensing into the vessel.

3 Claims, 3 Drawing Sheets

(51) Int. Cl.
*B67D 1/02* (2006.01)
*B67D 1/10* (2006.01)

(58) Field of Classification Search
CPC ...... B67D 1/0058; B67D 1/04; B67D 1/0406; B67D 1/0425; B67D 1/127; B67D 1/1275–1/1416
USPC .............. 99/287, 289 R, 293, 299, 316, 323, 99/323.1–323.3; 426/474–477; 261/19, 261/24–30
See application file for complete search history.

(56) References Cited

U.S. PATENT DOCUMENTS 4,113,147 A * 9/1978 Frazier ................ A47J 41/0033 222/131
4,204,613 A 5/1980 Terzian
4,238,053 A 12/1980 Bonini
4,279,938 A 7/1981 Hildebrand
4,407,356 A 10/1983 DeLau
4,494,600 A 1/1985 DeLau
4,559,979 A 12/1985 Koblasz et al.
4,599,872 A 7/1986 Rist
4,610,888 A 9/1986 Teng
4,720,076 A 1/1988 Hyde
4,742,942 A 5/1988 Dokos et al.
4,892,230 A 1/1990 Lynn, Jr.
4,921,135 A 5/1990 Pleet
5,031,831 A 7/1991 Williams, III
5,062,548 A 11/1991 Hedderick et al.
5,199,609 A 4/1993 Ash, Jr.
5,240,144 A 8/1993 Feldman
5,251,787 A 10/1993 Simson
5,288,289 A 2/1994 Haak
5,292,038 A 3/1994 Seney
5,335,705 A 8/1994 Morishita et al.
5,415,002 A 5/1995 Koenig
5,454,406 A 10/1995 Rejret
5,466,473 A 11/1995 Forage
5,571,548 A 11/1996 Lynch et al.
5,573,145 A 11/1996 Groh
5,667,832 A 9/1997 Tromans
5,683,732 A 11/1997 Baxter et al.
5,947,378 A 9/1999 Rebotier
5,980,959 A 11/1999 Frutin
6,131,763 A 10/2000 Stanish et al.
6,199,386 B1 3/2001 Garrett
6,457,614 B1 10/2002 Amidzich
6,546,737 B1 4/2003 Heyes et al.
6,551,588 B1 * 4/2003 McBride .............. A61K 38/193 424/184.1
6,740,345 B2 * 5/2004 Cai ......................... A47J 31/14 426/112
7,281,392 B2 10/2007 Liu
7,335,387 B2 * 2/2008 Hayes ................... A47J 31/002 426/112
7,367,479 B2 5/2008 Sitz
7,478,583 B2 1/2009 Scullion et al.
7,810,679 B2 10/2010 Wauters
8,038,039 B2 10/2011 Kelly et al.
8,066,152 B2 11/2011 Tetreault
8,162,011 B2 4/2012 Weems
8,167,173 B1 5/2012 Simmonds
8,383,184 B2 * 2/2013 Gugerli ................. A47J 31/401 426/506
8,453,882 B2 6/2013 Johnson
8,522,968 B2 * 9/2013 Middleman ............ A47G 21/00 206/219
8,657,262 B2 * 2/2014 Burri ................... A47J 31/4485 261/26
8,777,067 B2 7/2014 Trulaske
8,931,651 B2 1/2015 Van Hove
9,297,575 B1 3/2016 Gardner
2002/0088823 A1 7/2002 Tabacchi et al.
2002/0130137 A1 9/2002 Greenwald et al.
2007/0204930 A1 9/2007 Phallen et al.
2010/0127015 A1 5/2010 Boyer
2010/0158489 A1 6/2010 Siu
2012/0035761 A1 2/2012 Tilton et al.
2013/0064941 A1 3/2013 Taitler
2015/0064321 A1 * 3/2015 Story ........................ C12C 5/02 426/329

FOREIGN PATENT DOCUMENTS

GB EP19950303174 A2 11/1995
JP H07101497 A 4/1995
JP WO2015/005474 A1 1/2015

* cited by examiner

CARBONATED FLUID DISPENSER WITH ULTRASONIC FOAMING MECHANISM

This application is a continuation-in-part application of U.S. patent application Ser. No. 14/703,991, having an EFS-ID No. 22254695, filed 5 May 2015. This application claims priority to provisional application No. 62/177,346.

TECHNICAL FIELD

The present disclosure relates in general to beverage dispensing, and more particularly to the dispensing of a carbonated beverage from any container into a glass, providing a portion of the beverage as foam atop of the dispensed beverage.

BACKGROUND

Although any carbonated beverage may produce a foam layer on top of its poured contents, the foam layer on a poured serving of beer is of particular interest to many consumers. The foam layer, referred to as a head, atop a vessel of beer is produced by bubbles of gas, commonly carbon dioxide, that rise to the surface. The compounds that produce the head comprise proteins, yeast and starches in the form of grain residue in the beer. The interaction between the carbon dioxide the proteins and starches in the liquid determine the physical properties of the foam. Carbon dioxide may be produced during fermentation or if the beer is pasteurized it may be carbonated by injecting pressurized gas after pasteurization. Of particular interest to consumers is the density and longevity of the head. As with many reactions, agitation can increase the rate of reaction. Although it is common to produce a head on top of a glass of beer, similarly, foam may also be produced from carbonated soft drinks, carbonated juices or non-alcoholic malt beverages.

It is commonly considered that a greater-than-desired volume of head on the beverage detracts from the mass of the drink, while some head is considered essential to the beverage. The head gives off an aroma of the beer/beverage, and adds to the experience of enjoying the beverage. The production of the head reduces the amount of carbon dioxide in the remainder of the beverage.

While many methods exist for providing a stable, dense head on beer dispensed from casks or pressurized bulk containers, it has long been understood that there are problems associated with attempting to achieve the same effect on beer dispensed from bottles, cans or common single-serve containers. There is a need for a means and apparatus to produce a fine, dense head on a dispensed beer from a variety of disparate containers.

SUMMARY

In accordance with embodiments of the present disclosure, an apparatus and method, in general, for dispensing a liquid, including a carbonated beverage such as beer; and in particular, for dispensing a portion of the beverage without altering the concentration of pressurized gas in the beverage; and further, for dispensing a portion of the beverage in the form of a fine, dense head of foam. One skilled in the art will understand that a variety of liquids may be dispensed in a foamed state, and that while it may be desirable to dispense a portion of the liquid in a non-foamed state and a portion of the liquid in a foamed state, in other applications it may be desirable to dispense the entirety of the contents in a foamed state or the entirety of the contents in a non-foamed state.

In one embodiment the apparatus comprises a base for supporting a container such as a glass or mug or the like. Engaged with the base is a body providing a chamber, closed on all but one side, suitable for housing a beverage container such as a can, bottle, jug or the like. An upper housing is engaged with the body, in a manner wherein a fluid-tight seal may be obtained between the body and the upper housing at the open end of the body.

A fluid path, or conduit, extends from the interior of the body into the upper housing and terminates at a spout that is proximal to the top of the glass to be filled with the dispensed liquid. The liquid in the beverage container is moved through the conduit by increasing the air pressure in the body, thus moving the liquid by the property of displacement. In the region proximal to the spout an oscillation means produces a sonic wave through the conduit and hence through the liquid being dispensed. The oscillation's agitation of the liquid increases the reaction that produces foam or head. Small rapid oscillations tend to produce a fine, dense foam.

One skilled in the art will understand that the end result achieved by a control circuit employed to send an electrical current to a solenoid valve may also be achieved by a manually operated valve and subsequent substitutions of mechanical operators to an electronic system. In other words, although the same means may be achieved by a mechanical apparatus, the following embodiment is described as having an electronic controller.

Other objects and features will become apparent from the following detailed description considered in conjunction with the accompanying drawings. It is to be understood, however, that the drawings are designed as an illustration and not as a definition of the limits of the invention.

BRIEF DESCRIPTION OF THE DRAWINGS

To assist those of skill in the art in making and using the disclosed beverage dispenser and associated methods, reference is made to the accompanying figures, wherein.

DESCRIPTION

As discussed in greater detail below, an apparatus and method providing dispensed liquid and dispensed, foamed liquid is described. In general, the embodiment is placed atop a beverage container, the embodiment having a first conduit that enters the air space in the container without entering the liquid and a second conduit that is inserted into the liquid. The embodiment has a sealing means for engaging with the opening of the beverage container. With the embodiment engaged with the opening of a beverage container and creating a fluid-tight, or in this case, an air-tight seal, over the open side of the container, a control switch may be moved in a first direction wherein a pump moves air through the first conduit, and so increases the air pressure inside the container. The increased air pressure in the container moves the beverage by the property of displacement, through the second conduit wherethrough it flows through the housing of the embodiment where it is dispensed into a vessel such as a beer glass. When the lever is moved to a second position, a high frequency oscillation means produces a sonic wave through the conduit and hence through the liquid being dispensed. The high frequency produces a fine, dense foam that floats on top of the dispensed beverage.

Figure 1:
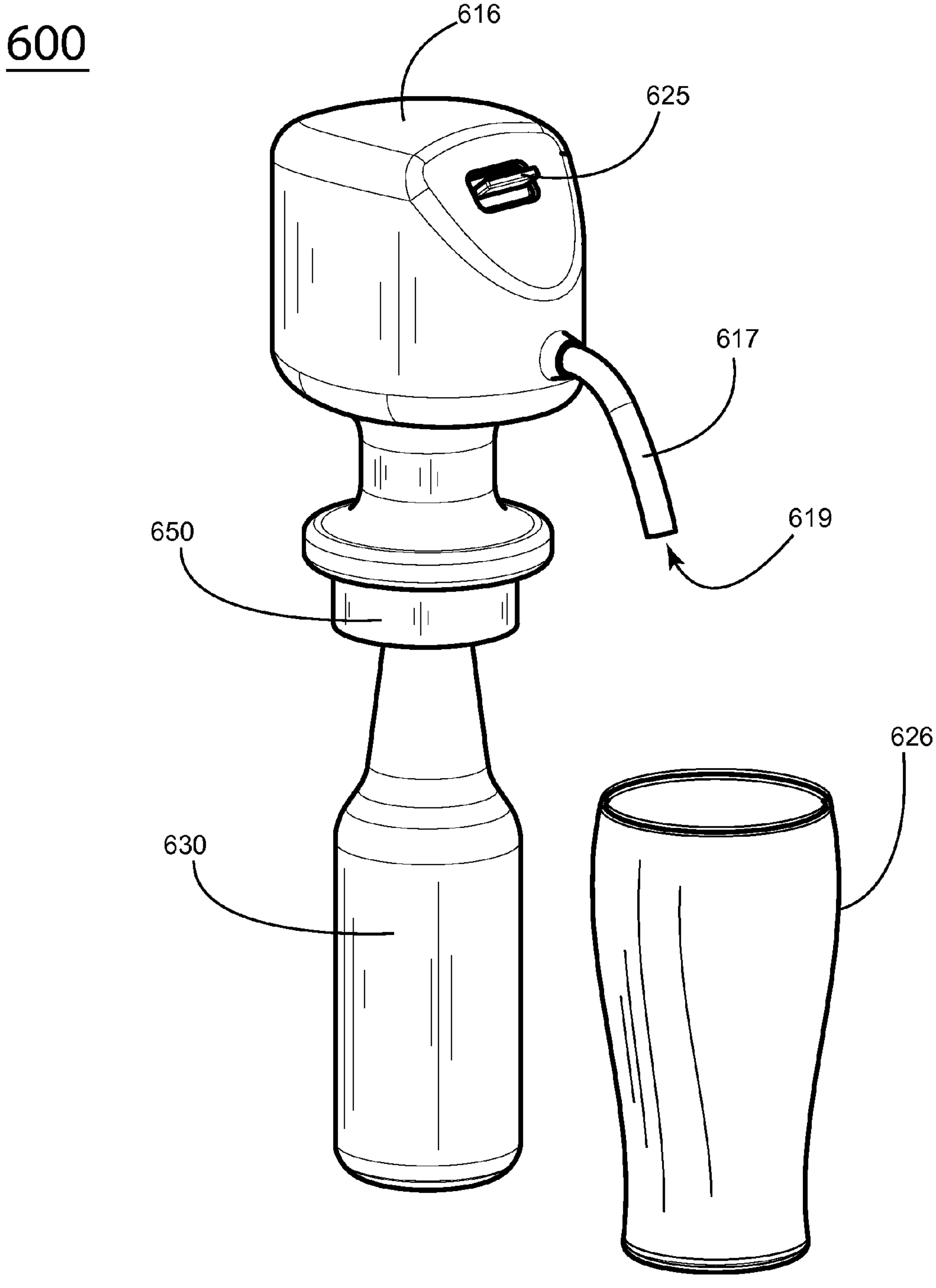
FIG. 1 is a perspective drawing of the embodiment.

Referring to FIG. 1, an example embodiment 600 comprises a housing 615 that removably engages with a beverage container 630 by way of a sealing means 650. The housing further comprises a switch 625 and a nozzle 617 which has a distal opening 619. The switch 625 may be a three position switch, having two active positions and an neutral position. The neutral position of a three position switch is also referred to as the off-position.

Figure 2:
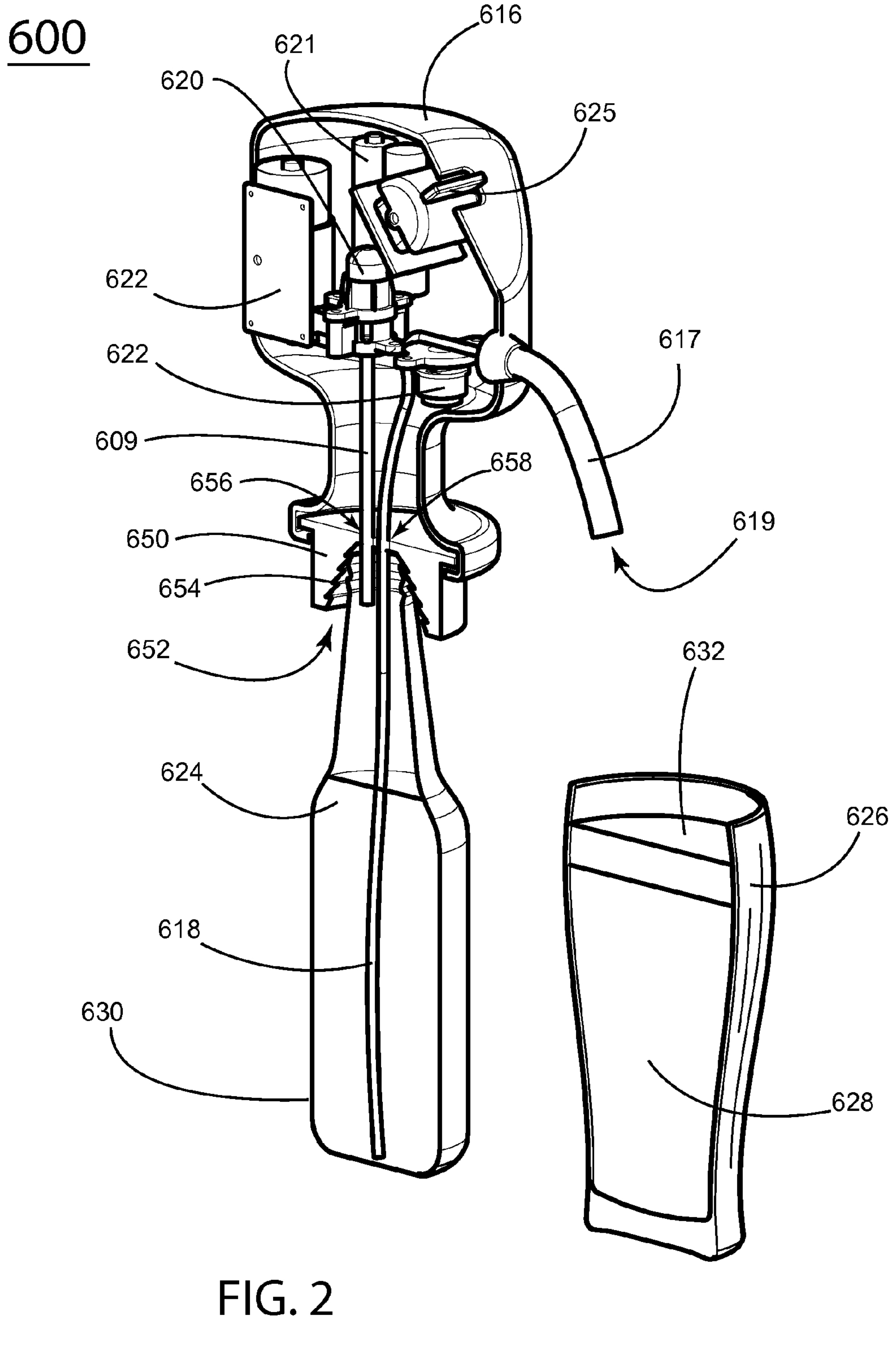
FIG. 2 is a partial section, perspective drawing of the embodiment of FIG. 1.
Figure 3:
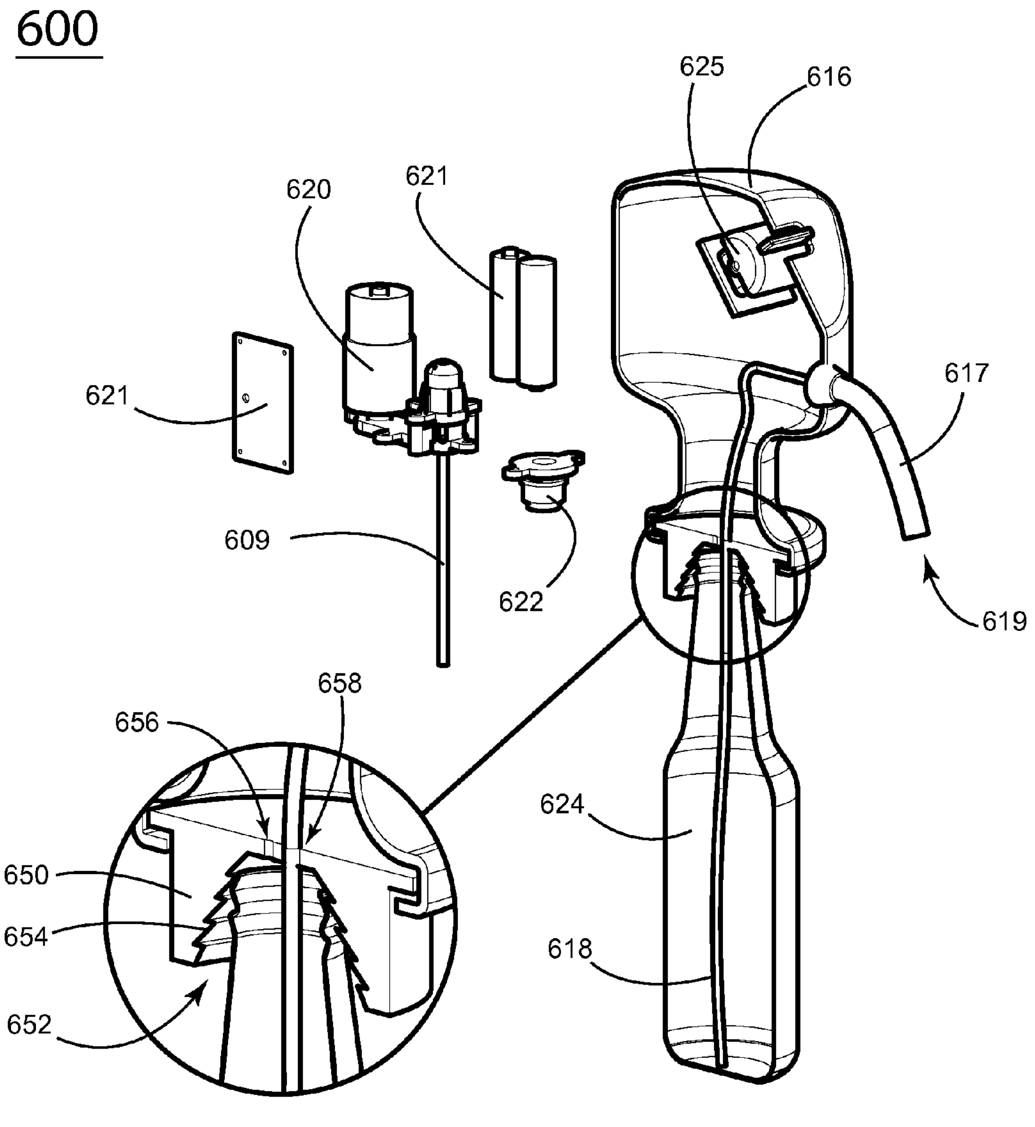
FIG. 3 is a partial section, exploded, perspective drawing of the embodiment of FIG. 1.

Turning now to FIG. 2 and FIG. 3 a partial section view is shown in FIG. 2 and a partial section, exploded view is shown in FIG. 3. The housing 616 contains a power source 621 that provides electricity to the internal components including a control circuit 622 that receives signals from the switch 625 and controls a pump 620 and an oscillator 622. The housing is engaged with an elastomeric sealing means 650 that has an opening 652 having tapered sides 654 that provide a seal around the opening of the beverage container 630. The tapered sides 654 provide a seal to various size container openings. The sealing means 650 has two openings proximal to the center of the sealing means, one opening 656, provides a means of passing a first conduit 609 through, and another opening 658 provides a means of passing a second conduit 618 through.

The first conduit 609 is engaged with the pump 620 such that air is pumped through the conduit and into the beverage container 630. As the switch 625 is moved to a first active position, a signal is sent to the control circuit 622 that, in turn, provides power from the power source 621 to the pump 620 that subsequently pumps air into the beverage container. As air is pumped into the beverage container 630, liquid 624 is moved by displacement through the second conduit 618. A portion of the second conduit 618 is proximal to the oscillator 622.

Liquid flowing through the second conduit 618 moves from the beverage container 630, past the oscillator 622 after which it proceeds through the nozzle 617 where it is dispensed through the distal opening 619 into a vessel such as a glass 626.

When the user chooses to create a foamed liquid from a carbonated beverage such as beer, the lever 625 is moved to the second active position that signals the control circuit 622 to continue providing power to the pump 620 thus continuing the flow of the liquid through the second conduit 618 and further signals the control circuit 622 to provide power to the oscillator 622. The oscillator 622 produces an oscillatory wave through the conduit 618 and hence through the liquid. The oscillatory wave agitates the liquid, increasing the reaction between the carbon dioxide and the proteins and starches in a liquid containing such proteins and starches, thus producing foam 630 that floats on top of the dispensed liquid 628. When the beverage has been dispensed, the lever 625 is moved to a neutral position thus signaling the control circuit to cease powering components thus turning the device off.

Although embodiments describe liquid under pressure, one skilled in the art can understand that the invention may also work with liquid flowing through a conduit at ambient pressure.

A more complete understanding of the components, processes, and apparatuses disclosed herein can be obtained by reference to the accompanying figures. These figures are intended to demonstrate the present disclosure and are not intended to show relative sizes and dimensions or to limit the scope of the disclosed embodiment(s). In particular, the figures provided herein are not necessarily to scale and, in certain views, parts may be exaggerated for clarity.

Although specific terms are used in the following description, these terms are intended to refer only to particular structures in the drawings and are not intended to limit the scope of the present disclosure. It is to be understood that like numeric designations refer to components of like function.

The term "about" or "approximately" when used with a quantity includes the stated value and also has the meaning dictated by the context. For example, it includes at least the degree of error associated with the measurement of the particular quantity. When used in the context of a range, the term "about" or "approximately" should also be considered as disclosing the range defined by the absolute values of the two endpoints. For example, the range "from about 2 to about 4" or "from approximately 2 to approximately 4" also discloses the range "from 2 to 4."

While example embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. An apparatus for producing foam from beer while dispensing said, beer comprising:

a power source; and at least one switch; and a control circuit; and a pump; and an ultrasonic transducer; and a seal; and a beverage container containing beer and having one open end; and a first conduit having a proximal end engaged with said pump, and a distal end passing through said seal and into said beverage container; and a second conduit having a proximal end for inserting into said beer, passing through said seal having potion that is proximal to said ultrasonic transducer and having a distal end exiting the apparatus; wherein the apparatus is positioned over the open end of said beverage container and the seal, providing a seal between said one open end beverage container and the apparatus; and the first conduit passing from said pump, through said seal, through said open end of said beverage container into said beverage container, further providing the proximal end of the second conduit within the beer; and said at least one switch providing power from said power source to said control circuit, sending power to said pump thus pumping air, and providing increased pressure in the pressure in the beverage container wherein the transference of the liquid through the second conduit and to the distal end exiting the apparatus; and upon engagement of an additional switch, said control circuit continues sending power to said pump while sending power and so engaging said ultrasonic transducer, thus providing oscillating waves through the liquid flowing through said second conduit, proximal to said ultrasonic transducer causing the beer to foam as it leaves the distal end of the conduit; thus dispensing both beer and foamed beer.

2. The apparatus of claim 1 wherein the beer is provided in a beverage container that is a glass bottle.

3. The apparatus of claim 1 wherein the beer is provided in a beverage container that is a can.

* * * * *